United States Patent
Vicknair et al.

(10) Patent No.: US 9,429,253 B1
(45) Date of Patent: *Aug. 30, 2016

(54) SYSTEM AND METHOD OF SECURING AN APPARATUS TO AN OPENING

(71) Applicants: John F. Vicknair, Saint Amant, LA (US); Andrew Pregeant, LaPlace, LA (US)

(72) Inventors: John F. Vicknair, Saint Amant, LA (US); Andrew Pregeant, LaPlace, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,594

(22) Filed: Jul. 15, 2013

Related U.S. Application Data

(63) Continuation-in-part of application No. 12/916,671, filed on Nov. 1, 2010, now Pat. No. 8,484,816.

(51) Int. Cl.
  *F16L 5/00* (2006.01)
  *F16L 37/084* (2006.01)
  *F16L 37/086* (2006.01)

(52) U.S. Cl.
  CPC .............. *F16L 5/00* (2013.01); *F16L 37/086* (2013.01); *F16L 37/0848* (2013.01)

(58) Field of Classification Search
  CPC . F16L 37/084; F16L 37/0848; F16L 37/086; F16L 5/00

USPC ......... 285/414, 317, 320, 312, 136.1, 68, 69
See application file for complete search history.

(56) References Cited

U.S. PATENT DOCUMENTS

| | | | | |
|---|---|---|---|---|
| 409,512 A | * | 8/1889 | Smith | 285/320 |
| 533,761 A | * | 2/1895 | Walker et al. | 285/320 |
| 558,364 A | * | 4/1896 | Doolittle | 285/320 |
| 794,082 A | * | 7/1905 | Crone | 137/232 |
| 831,358 A | * | 9/1906 | Lally | 285/317 |
| 981,706 A | * | 1/1911 | Spencer | 251/149.9 |
| 1,812,678 A | * | 6/1931 | Bernert | 285/320 |
| 2,851,286 A | * | 9/1958 | Bishop | 137/359 |
| 3,153,548 A | * | 10/1964 | Speakman | 285/317 |
| 4,444,419 A | * | 4/1984 | Maeshiba | 285/320 |
| 4,817,991 A | * | 4/1989 | Frentzel et al. | 285/317 |
| 8,484,816 B1 | * | 7/2013 | Vicknair et al. | 285/320 |

* cited by examiner

*Primary Examiner* — David E Bochna
(74) *Attorney, Agent, or Firm* — Andrew G. Vicknair

(57) ABSTRACT

A mechanism for securing devices to various openings in tanks, vessels, walls, and the like. The system includes a fastening mechanism, a securing device, and a raised lip. The fastening mechanism functions to hold devices up against the vessel opening where the system is used while the securing device may function to secure hoses that may be utilized with fans or ventilators that are to be utilized with the system.

18 Claims, 6 Drawing Sheets

SYSTEM AND METHOD OF SECURING AN APPARATUS TO AN OPENING

CROSS REFERENCE TO RELATED APPLICATIONS

This application is a Continuation-In-Part application relying on applicants' previously filed application Ser. No. 12/916,671 filed on Nov. 1, 2010.

TECHNICAL FIELD OF INVENTION

The present invention relates, in general to a device utilized in securing items, such as vents, ductwork, blowers and fans to vessels during periods of maintenance in a secure and safe manner and to allow for exit of the vessel safely in emergency situations.

BACKGROUND OF INVENTION

Vessels utilized in industrial facilities of all types and shapes are deactivated and undergo various types of maintenance at various times depending on a user's schedule. When such vessels undergo maintenance, workers often have to enter the vessel to work inside of the vessel and perform various maintenance activities in the vessel. When such activity takes place, at least one vessel opening and possibly more than one will act as a dedicated man-way to allow workers to have a dedicated opening for the entry and exit into/out of the vessel. At the same time, at least one other vessel opening will act as a dedicated ventilation point whereby various devices will blow fresh air into the vessel and/or remove hazardous fumes from the vessel. This ventilation process is usually accomplished by blowers and/or fans.

Such fans and/or blowers are usually attached to a vessel opening with the use of rope, wire, and other securing mechanisms. While the use of rope and/or wire does function to hold a fan and/or blower to a vessel opening, there are dangers associated with the use of rope and/or wire. For example. The rope and/or wire could break causing the fan and/or blower to dislocate from the vessel and possibly harm workers near that vessel opening. In addition, if the rope and/or wire were to break, the vessel will no longer obtain the needed ventilation for workers performing maintenance inside of the vessel. While fans/blowers could be mounted directly to a vessel opening, any such mounting would take away that vessel opening as an entry/exit point for any workers performing maintenance inside of the vessel. Accordingly, a need exists in the art for a system and method that allows objects, such as fans and/or blowers to be securely fastened to a vessel opening such that the vessel opening may simultaneously serve as an entry and/or exit point for the vessel should the need arise.

BRIEF SUMMARY OF THE INVENTION

The present invention is a system and method for securing objects such as vents, ductwork, fans and/or blowers to confined space openings, such as openings to vessels and/or tanks, in such a manner that is safe and provides the additional benefit of not taking away an entry/exit point of the confined space or vessel. In particular, the present invention is capable of mounting to a confined space opening (vessel and/or tank opening) such that the confined space opening may also function as an entry/exit point for the confined space.

In one embodiment of the present invention, an additional safety mechanism is provided to secure pressurized hoses, such as air hoses, to prevent the possibility of injuries caused by broken hoses that whip back and forth after breaking from the blower and/or fan secured to the vessel opening. A technical advantage of the present invention is provided so that a confined space opening can serve as both a ventilation point and an entry/exit point.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. This application is not related to any other applications.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Referring now in more detail to the drawings, a few embodiments of the present invention will now be described in more detail.

Figure 1:
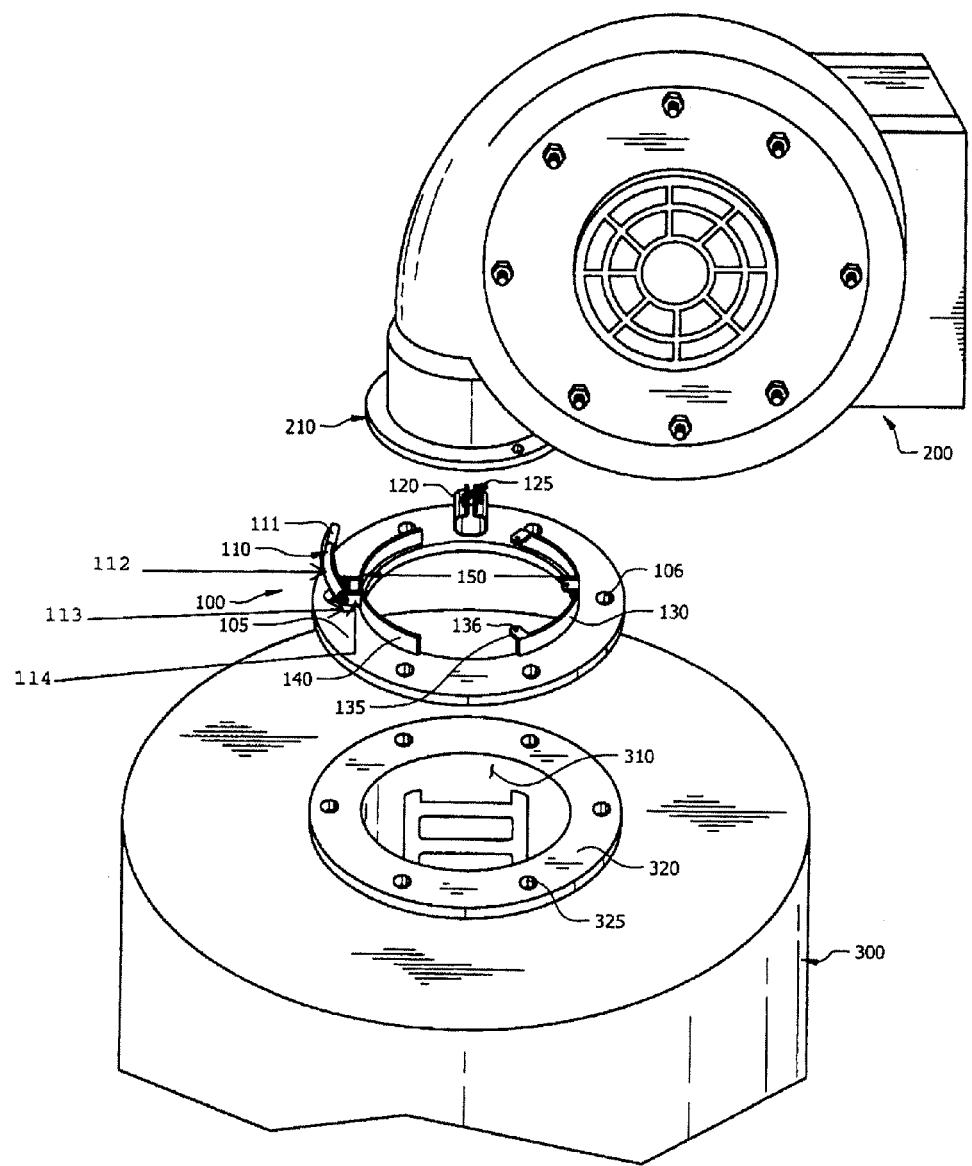
FIG. 1 is an illustration of one embodiment of the present invention.
Figure 2:
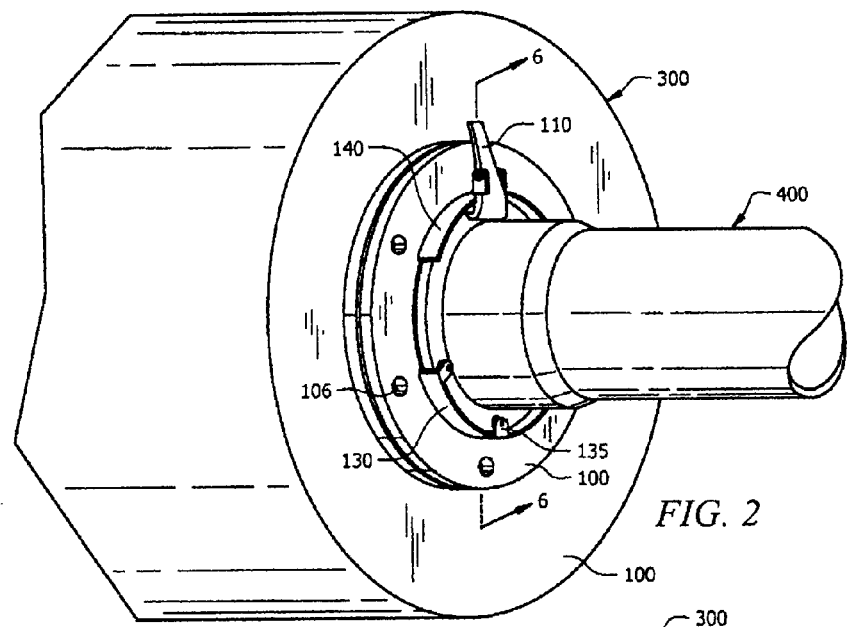
FIG. 2 is another illustration of the embodiment of FIG. 1.
Figure 3:
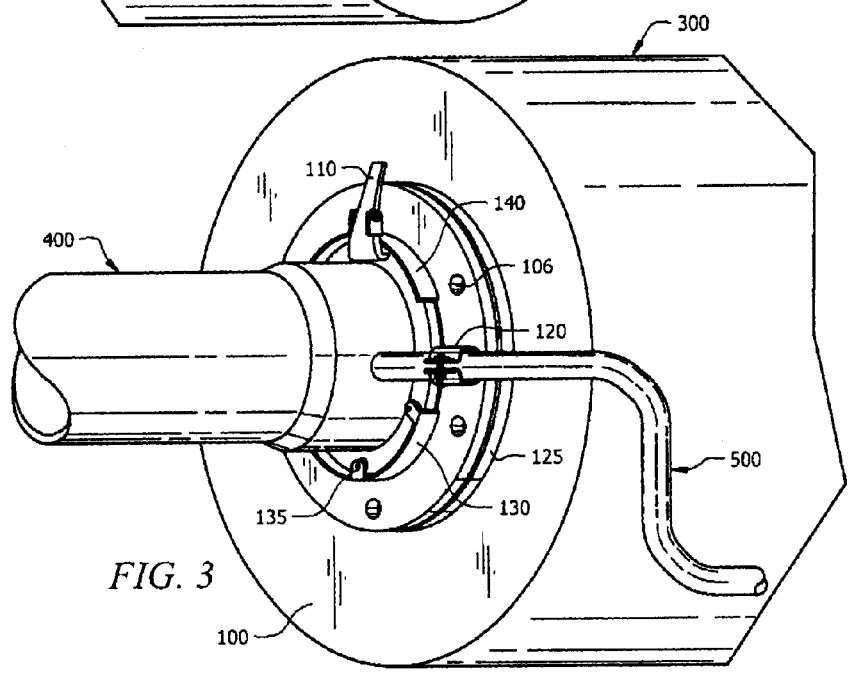
FIG. 3 is another illustration of the embodiment of FIG. 2.
Figure 4:
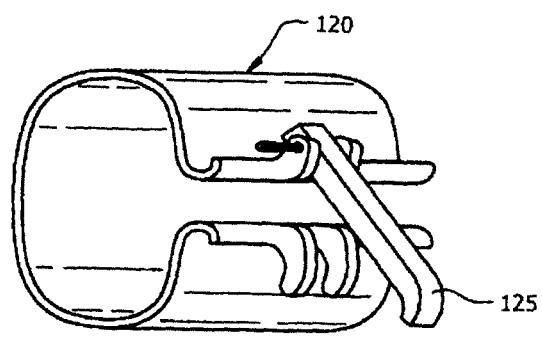
FIG. 4 is an illustration of a close up view of one component of the present invention.
Figure 5:
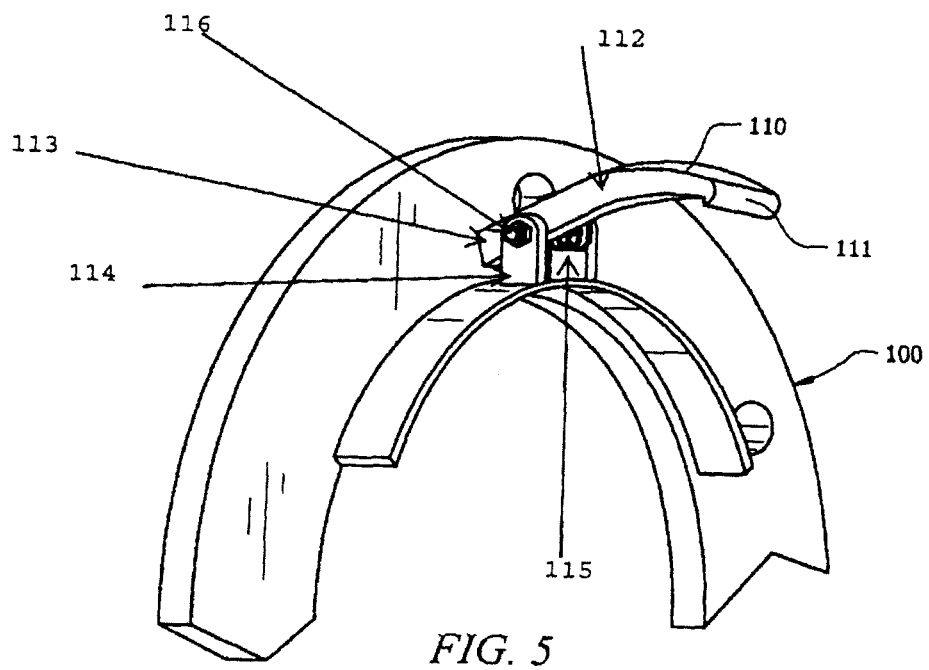
FIG. 5 is another illustration of a close up view of one component of the present invention.
Figure 6:
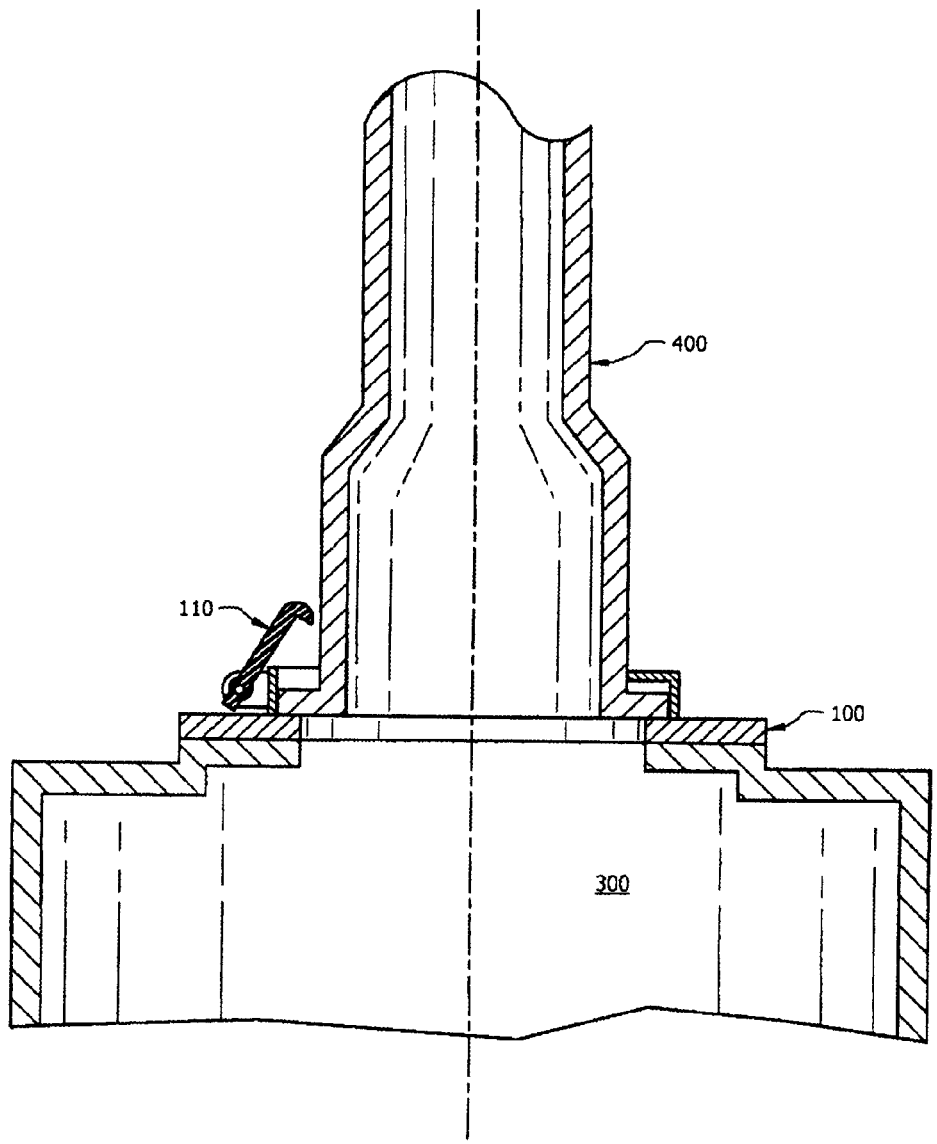
FIG. 6 is a cross-section illustration of one embodiment of the present invention.
Figure 7:
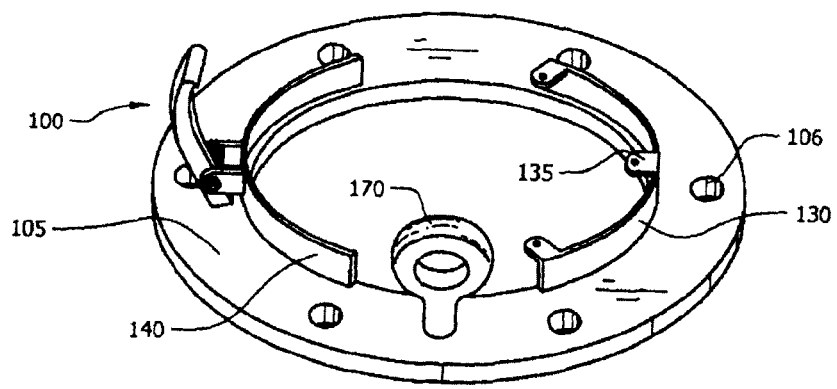
FIG. 7 is an illustration of an embodiment of the present invention.
Figure 8:
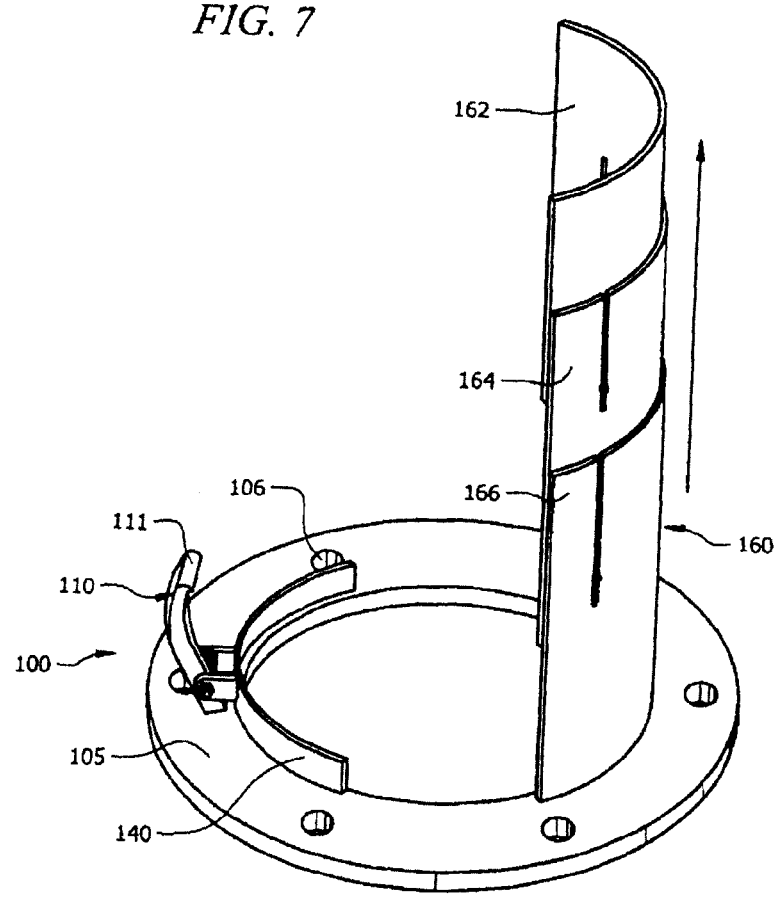
FIG. 8 is an illustration of another embodiment of the pre sent invention.

FIGS. 1, 2, and 3 illustrate a view of one preferred embodiment of the present invention in use. FIGS. 4 and 5 illustrate close up views of certain components of the present invention and FIG. 6 illustrates a cross sectional view of the present invention in use. FIGS. 7 and 8 illustrate other embodiments of the present invention. In FIG. 1, the safety flange 100 is illustrated in an exploded view whereby safety flange 100 is illustrated between tank 300 and apparatus 200. As illustrated in FIG. 1, safety flange 100 is ideally used to safely secure an apparatus, such as fan 200, to an opening in a vessel or tank 300 or any other type of enclosure, wall or other type of similar device/apparatus. Apparatus 200 is primarily some type of ventilation device, such as a blower, fan, air horn, and the like that operates to provide ventilation and/or some type of air flow into tank 300 or other opening.

In one embodiment of the present invention, safety flange 100 includes a lip/base 105 with a big hole in the center that has a diameter and the lip/base 105 may also include holes 106 that have a diameter smaller than the diameter of the big hole in the center of the lip/base 105. In addition, lip/base 105 may also include a fastening mechanism 110, a securing/holding device 120, raised lip 130, tabs 135, and fastening mechanism lip 140. Lip/base 105 with holes 106 functions as a plate that allows safety flange 100 to mount to any type of vessel or tank 300 or any other type of enclosure, wall or other type of similar device/apparatus.

In the embodiment of the present invention illustrated in FIG. 1, raised lip 130 and fastening mechanism lip 140 are arranged to create a space/area 150 between 130 and 140 that defines the space for an object, such as a blower, fan or ventilator to slide into and be utilized with safety flange 100. The present invention may also be configured so that raised lip 130 may include tabs 135. Tabs 135 preferably extend perpendicularly out away from lip 130 and act to provide a resting point and an additional means of support for an object used with safety flange 100. Tabs 135 may also include holes 136 located near the end of tabs 135 whereby holes 136 provide a user with the option to insert fastening devices, such as screws or bolts, to add additional force and pressure to an object used with safety flange 100. However, the embodiment illustrated in FIG. 1 is not a limitation as safety flange 100 may be configured so that it does not comprise raised lip 130, but rather only contains fastening mechanism lip 140.

Fastening mechanism 110 may be configured with a contact end 111, an elongated member 112, a depressed end 113, connection tabs 114, torsion member 115, and securing mechanism 116 as illustrated in FIGS. 1 and 5. In such an embodiment, elongated member 112 is the main member of fastening mechanism 110 that ultimately functions with the other components to exert force upon the device to be held in place by the present invention. One end of the elongated member 112 is contact end 111, which is a portion of fastening mechanism 110 that will come into contact with devices to be secured/held in place by the present invention. The opposite end of elongated member 112 is depressed end 113, which is a portion of fastening mechanism 110 that a user will depress and/or push down upon that will apply force upon torsion member 115 which will result in lifting elongated member 112 up and away from space/area 150 so that a device may be located within space/area 150. As illustrated in FIG. 5, once depressed end 113 of the fastening mechanism 110 is depressed, the elongated member 112 of fastening mechanism 110 will lift up and out of space/area 150. After the fastening mechanism 110 is depressed via force upon depressed end 113 and moved out and away from space/area 150, the device, such as fan 200 or the part of the fan where air is moved forward, may be positioned within space/area 150 so that air from the fan may be directed into hole 310 of vessel 300.

Connection tabs 114 are preferably secured to lip 140 and may protrude perpendicularly outward from lip 140 as illustrated in FIG. 5. Tabs 114 function to provide a mounting location for torsion member 115 and elongated member 112 in order to enable fastening mechanism 110 to be secured to lip 140. Securing mechanism 116 may be some sort of bolt or screw with nuts that function together to secure torsion member 115 and elongated member 112 to one another and to tabs 114 to enable fastening mechanism 110 to operate as one unit. In one embodiment of the present invention, torsion member 115 may be a spring that acts in conjunction with the other components of fastening mechanism 110 to apply force down upon an object placed under it whereby the force is large enough to hold the object within the space/area 150 created by the arrangement of raised lip 130 and fastening mechanism lip 140.

In one embodiment, fastening mechanism 110 may be configured to function as a quick release to enable a device, such as a fan, to be swiftly removed from a tank opening/man-way in emergency situations. In alternative embodiments of the present invention, fastening mechanism 110 may also be configured so that the contact end 111 of fastening mechanism 110 that comes into contact with devices may also include some type of magnet that will exert some additional force upon the device, such as fan 200, to provide added security to hold the device, such as fan 200, in place. While the embodiments of FIGS. 1 and 5 only illustrate one fastening mechanism 110, the present invention is not limited to such configuration as the present invention may be configured with multiple fastening mechanisms arranged at different locations on safety flange 100.

As illustrated in FIG. 1, a typical tank 300 is illustrated with a hole 310 in which a flange 320 is located near hole 310. Tank flange 320 includes holes 325 which enable items to be mounted to tank 300, such as pipes, blind flanges, and the like. Holes 106 of safety flange 100 are configured so that they will align and correspond with reciprocal holes located on any number of devices, walls, vessels, valves, other flanges, and the like. For example, holes 106 as illustrated in FIG. 1 are configured to align with holes 325 of tank flange 320 of tank 300.

In a preferred embodiment, safety flange 100 will be utilized to safely secure a device, such as a fan 200, blower, air circulator, air horn and the like to a vessel opening, a tank opening, an enclosure, wall, or other similar device. As illustrated in FIGS. 1, 2 and 3 safety flange 100 may be mounted to tank 300 with a fastening mechanism, such as bolts, that will extend through holes 106 of safety flange 100 and through holes 325 of tank flange 320. Nuts may then be utilized and tightened on the bolts so that safety flange 100 is securely fastened to tank 300. After safety flange 100 is fastened to tank 300, a user may safely secure a device, such as fan 200, to tank 300 with the use of safety flange 100.

After safety flange 100 is secured to a vessel, such as tank 300, a user can secure a fan to a vessel via safety flange 100. In one embodiment, such as the embodiment illustrated in FIG. 1, fan 200 will fit within the space/area 150 and butt up against opening 310 in tank 300 and fastening mechanism 110 will act to apply force downward on fan 200 to hold fan 200 up against the opening in the tank, vessel, wall, and the like. In the embodiment illustrated in FIG. 1, a user can press down upon depressed end 113 of fastening mechanism 110 in order to lift elongated member 112 up and out of the space/area 150. FIG. 5 illustrates a close up view of a portion of safety flange 100 that clearly illustrates fastening mechanism 110 in a depressed or activated position. As illustrated in FIG. 5, once the fastening mechanism 110 is depressed/activated, elongated member 112 of fastening mechanism 110 will lift up and out of the space/area 150. After the fastening mechanism 110 is depressed and moved out and away from the space/area 150, the device, such as fan 200 or the part of the fan where air is moved forward, may be positioned within the space/area 150 so that air from the fan may be directed into hole 310 of vessel 300. When fan 200 is positioned in the space/area 150, a user will have to position fan 200 so that it fits under tabs 135 of lip 130.

After the device, such as fan 200 is positioned within the space/area 150, fastening mechanism 110 may be de-activated or released so that fastening mechanism 110 will exert a constant force on fan 200 to ensure that fan 200 will remain securely butted up against hole 310 of tank 300. As illustrated in FIGS. 2 and 3, when fastening mechanism 110 is released, fastening mechanism 110 will press down upon the device mounted to tank 300 via safety flange 100. In particular, FIGS. 2 and 3 illustrate the use of the present invention to secure an air horn 400 to tank 300. As illustrated, air horn 400 was placed within the space/area 150 of safety flange 100 and under tabs 135 of raised lip 130. After air horn 400 is placed within safety flange 100 and butt up against the opening 310 in tank 300, fastening mechanism 110 is released to press down upon and exert force upon air horn 400 to hold air horn 400 securely up against tank 300.

FIG. 6 illustrates a cross-sectional view of an embodiment of the present invention in use along line 6 of FIG. 2. As illustrated in FIG. 6, once fastening mechanism 110 is released and is applying a force upon a device, such as fan 200 or air horn 400, that device will be forced up against the vessel opening such as tank opening 310 of tank 300 of FIG. 1 so that air horn 400 may operate to provide ventilation to tank 300 as air horn 400 will be securely butt up against the vessel opening.

In addition to fastening mechanism 110, a user may utilize some type of screw or other similar device to exert some additional force on a device mounted up against tank 300, such as fan 200 or air horn 400, by placing the screw or other similar device through holes 136 of tabs 135. This force will only be applied to the section of the fan under tabs 135 of lip 130. The utilization of fastening mechanism 110 along with screws into holes 136 of tabs 135 operate in conjunction with one another to provide force on opposite sides of a device mounted up against tank 300, such as fan 200 or air horn 400, to secure fan 200 or air horn 400 to tank 300. This combination of forces exerted upon the device mounted up against tank 300, such as fan 200 or air horn 400, creates a safe connection of the device to tank 300 without the need for rope or other items that may be used to unsafely secure devices to tank openings and man-ways.

This secure fastening provided by safety flange 100 is safer than the use of various methods currently used, such as ropes for securing fans to vessels. The present invention allows a vessel opening that is being used for ventilation to be easily converted into an entry/exit point for a vessel, such as in the case of emergency situations. Safety flange 100 enables such transformation as an individual working inside of a tank may exert force upon the device, such as fan 200 or air horn 400, which is butt up against tank 300 via safety flange 100 and move the device out of the tank opening thereby creating a clear entry/exit point. This occurs when the device, such as fan 200 is dislodged and move out of the vessel opening. For example, when a device, such as fan 200, is secured with fastening mechanism 110 and screws in holes 136 of tabs 135, the force securing fan 200 or other device may be broken by application of force in a direction opposite to the force applied by fastening mechanism 110. For example, if safety flange 100 were being used to secure a fan, such as fan 200 or ventilator, to a vessel man-way or opening such as opening 310, then an individual, such as a mechanic working in the vessel, can easily and quickly move the fan out and away from the vessel opening by simply pushing or kicking the fan from the inside of the vessel outward and away from the vessel opening. When such force is applied by the individual, this force will counteract the force applied by fastening mechanism 110 and result in the fan or ventilator being move out of the space/area 150 and away from the vessel opening. Once the fan or ventilator has been dislodged and moved away from the vessel opening, a new entry/exit point has been created for the vessel.

Securing/holding device 120 as illustrated in FIGS. 1 and 3 is preferably mounted to lip 105 of safety flange 100. Securing/holding device 120, as illustrated in FIGS. 1, 3, and 4, is preferably configured with a latch 125 that may latch down and assist in securing things placed within securing/holding device 120, such as a pressurized air hose. Securing/holding device 120 is preferably shaped in a semi-circular configuration so that it may receive hoses and other similar devices placed within as illustrated in FIGS. 3 and 4. Securing/holding device 120 provides added safety by securing cords, hoses, and the like that may be needed by devices utilized with safety flange 100. For example, as illustrated in FIG. 3, air horn 400 may operate with a pressurized air supply that is provided via hose 500. In such a configuration, hose 500 will be routed through securing/holding device 120 and then connected to air horn 400. After hose 500 is routed through securing/holding device 120, latch 125 may be moved into a closed position to secure hose 500 within securing/holding device 120.

Air hoses utilized in various industrial facilities to assist with providing ventilation to tanks and vessels are usually high pressure hoses that increase the potential for accidents if the hose should break. If such a hose, such as hose 500, were to be break or become disconnected from air horn 400, the hose will begin to whip back and forth creating a hazard and potential for injury. Securing/holding device 120 can reduce that hazard as it will function to secure the hose in place so that if hose 500 were to break or become disconnected from air horn 400, the potential for hose 500 to whip back and forth is greatly reduced as securing device 120 can hold hose 500 in a stationary position until an individual/mechanic has time to take care of any issues/problems with hose 500. While FIG. 1 illustrates securing device 120 as being mounted in a "12:00 o'clock" position with fastening mechanism 110 in a "9:00 o'clock" position, the present invention is not limited to any particular layout as the present invention may be configured in any layout.

FIG. 7 illustrates an embodiment of the present invention, wherein one can see a close up view of safety flange 100. Safety flange 100 may also be configured to include a lifting lug 170 that may be mounted or secured to lip 105 of safety flange 100. Lifting lug 170 can be used to assist users in lifting and/or moving safety flange from one location to another. In some embodiments, safety flange 100 may be configured to fit large man-ways/tank openings, and in such an embodiment, it may be difficult for users to manually move safety flange 100 from one location to another. Thus, safety flange 100 may be configured with lifting lug 170 so that a user may utilize a strap, cable, rope, chain or the like to connect to lifting lug 170 so that the user may use some type of mechanical device, such as a forklift, winch, or the like to assist in moving safety flange 100 from one location to another. Lifting lug 170 may take any shape and may be mounted or secured to different locations on lip 105. In addition, safety flange 100 may be configured with a plurality of lifting lugs mounted or secured to lip 105. The present invention is not limited to the configuration illustrated in FIG. 7.

FIG. 8 is an illustration of another embodiment of the present invention. As illustrated in FIG. 8, safety flange 100 may be configured in one embodiment to include a collapsible structure 160. Structure 160 may include several panels, 162, 164, and 166. As illustrated in FIG. 8, structure 160 is preferably a collapsible structure that is configured so that panels 162, 164, and 166 are capable of sliding upward and extending out and away from lip 105 of safety flange 100. Structure 160 is advantageous as it will function as a support member to provide support for some type of vent or duct system that may be temporarily secured within the space/area 150 (illustrated in FIG. 1). A vent and/or duct system may often be used to channel gases located within a tank/vessel, which will exit the tank when the tank/vessel is opened and safety flange 100 is installed, up and through the vent and/or duct system that is supported by structure 160 to channel these gases away from maintenance workers to increase the safety of said workers. When vessels or tanks are opened for maintenance, gases are present inside of the tank that may be harmful to maintenance workers. Thus, workers are often required to wear respirators when opening vessels/tanks so as to protect themselves from any harmful gases that may be in the tank and that will exit out of the tank when the tank/vessel opening/man-way is opened. These tanks/vessels needing maintenance work will often have gasses lighter than air in the tank before the tank is opened that will rise up and out of the tank/vessel opening/man-way when the opening/man-way is opened. In such a situation, structure 160 and panels 162, 164, and 166 can be slid up to provide support for a vent/duct system to be temporarily installed in the space/area 150 to assist in channeling the gases up out of the tank and away from maintenance workers. In some situations, facilities may pipe gases that are lighter than air into the bottom of an opened tank to assist in clearing a vessel of other gases. In such a situation, the piped in gases and some contaminates may exit out of the tank at the tank opening where safety flange 100 is installed. When this is done, a vent and/or duct system can be located within the space/area 150 to be supported by structure 160 to assist in moving the gases up and away from any workers that may be located near the open man-way where safety flange 100 is mounted.

In an alternative embodiment, structure 160 may also function as the vent/duct system to channel or guide the flow of gasses exiting from a tank and/or vessel up and away from the surface of the tank (or the mounting location where safety flange 100 is mounted to the tank/vessel). In such a situation, a user may mount safety flange 100 to the vessel opening/man-way and slide structure 160 up and out so that structure 160 will guide gases exiting out of the tank/vessel up and away from the tank so as to assist in moving the gases up and away from maintenance workers to increase the safety of the maintenance workers. In such an embodiment, structure 160 may be configured so that it is located 360 degrees around the opening of safety flange 100 so that when it is mounted to a tank/vessel opening/man-way, any gases exiting out of the tank will be channeled up and away by structure 160 which may also act to prevent any gases from exiting away from structure 160 until the top of structure 160 where structure 160 will no longer extend upward. In such a configuration where structure 160 is located 360 degrees around safety flange 100, there may be an indentation within structure 160 to allow fastening mechanism 110 to still function.

Structure 160, as illustrated in FIG. 8, may be located in the place of lip 130. However, the present invention is not limited to the specific arrangement/configuration illustrated in FIG. 8 as structure 160 may be configured in a different location on safety flange 100. In addition, structure 160 is not limited to panels 162, 164, and 166 as it may have any number of panels. Structure 160 may also be made of any number of materials, such as steel, PVC, plastic and the like.

Figure 9:
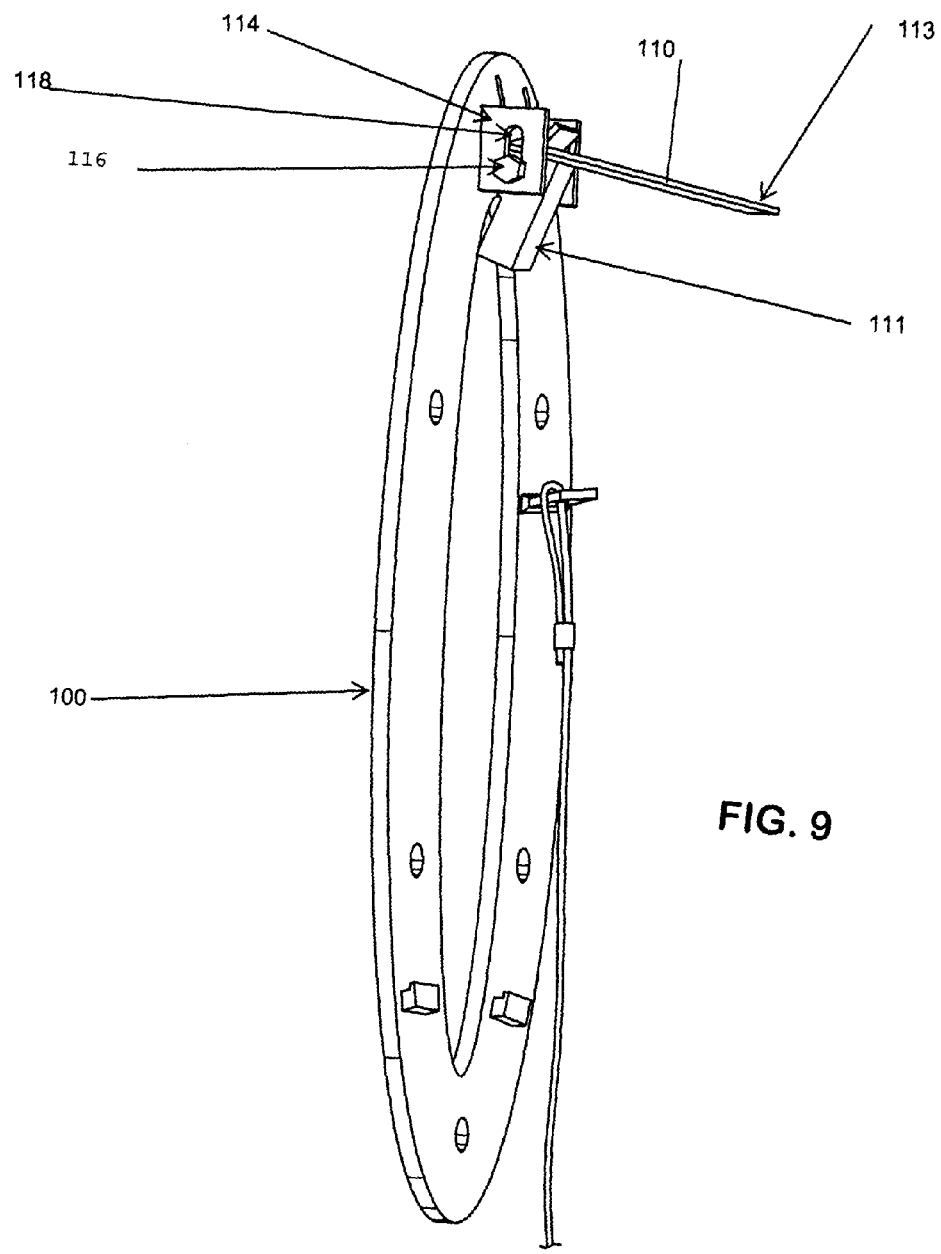
FIG. 9 is an illustration of another embodiment of the present invention.

FIG. 9 illustrates another embodiment of the present invention. As illustrated in FIG. 9, one embodiment of the present invention may be configured so that the safety flange 100 includes fastening mechanism 110 that is adjustable to accommodate for objects of different sizes, such as fan 200 or air horn 400. As illustrated in FIG. 9, connection tabs 114 are configured with a slot 118 so that securing mechanism 116 may be adjusted forward and backward which allows fastening mechanism 110 to be adjustable. For example if an object, such as fan 200, were to be mounted with safety flange 100, fastening mechanism 110 can be adjusted to accommodate objects of different sizes and to also adjust the location of the force applied by fastening mechanism 110 as by adjusting fastening member 110 the location of where contact end 111 will strike the object to be mounted, such as fan 200.

Safety flange 100 is not limited to any particular size as it may be configured to any number of different sizes depending on the nature of use. Likewise, safety flange 100 is not limited to any particular material as it may comprise any type or number of different types of materials depending on its use. For example, safety flange 100 may be made of stainless steel, chrome, aluminum, iron, Hastelloy®, cooper, lead, cobalt, nickel, titanium, any combination thereof and the like. Safety flange 100 may also be configured so that the diameter of holes 106 may vary depending on the nature of use. Holes 106 may be any size, such as 1 inch, 2 inch, 3 inch, 4 inch, 5 inch, 6 inch and the like.

Pursuant to the present invention, a method of utilizing the present invention would include the use of an embodiment of the present invention disclosed herein, such as the embodiment illustrated in FIG. 1. In such a method, an embodiment, such as FIG. 1, of the present invention is provided. After the embodiment is provided, a user may open a tank/vessel or wall opening and then secure the embodiment of the present invention to the tank/vessel or wall opening. Then, a user may press down upon depressed end 113 of fastening mechanism 110 to move elongated member 112 up and out of the space/area 150. Then, a user may position a fan and/or other ventilation device within the space/area 150. Next, a user may stop pressing down upon depressed end 113 so that contact point 111 will come into contact with and apply force down upon a fan and/or ventilation device to be used with the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, and composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for securing an apparatus to an opening comprising:
   a circular base member having a first diameter with a first hole located in said circular base member wherein said first hole has a diameter smaller than said first diameter wherein said base member also includes a plurality of holes spaced apart from one another;
   at least one raised lip protruding perpendicularly away from said base member; and
   a fastening mechanism secured to said raised lip wherein said fastening mechanism comprises:
      an elongated member with two ends wherein one end of said elongated member acts as an activation point and the other end of said elongated member is a contact point that comes into contact with said apparatus to be secured to said opening;
      at least two connection tabs mounted to said raised lip and protruding perpendicularly out from said raised lip;
      a tension member located between said two connection tabs; and
      a securing mechanism that secures said tension member and said elongated member to each other and to said connection tabs wherein said fastening mechanism is adjustable wherein said connection tabs comprise slots in said connection tabs whereby said securing mechanism may be positioned at different locations in said slots in said connection tabs.

2. The system of claim 1 further comprising:
   a second raised lip wherein said second raised lip protrudes perpendicularly away from said base member wherein said second raised lip is located near said first hole.

3. The system of claim 2 wherein said fastening mechanism applies a force upon said apparatus to be secured to said opening when said contact point of said elongated member is in contact with said apparatus to be secured to said opening.

4. The system of claim 2 wherein said base member is comprised of one or more of:
   steel;
   chrome;
   aluminum;
   Iron;
   cooper;
   lead;
   cobalt;
   nickel;
   titanium;
   fiberglass;
   rubber;
   clay;
   plastic; and
   polyvinyl chloride.

5. The system of claim 2 wherein said securing mechanism is a bolt and nut combination.

6. The system of claim 2 wherein said tension member is a torsion spring.

7. The system of claim 6 wherein said spring is configured so that the force exerted by said spring can be countered by the application of a counter-force applied to said contact point of said elongated member of said fastening mechanism such that when said counter-force is applied said elongated member of said fastening mechanism will move back and away from said first hole.

8. The system of claim 2 wherein said second raised lip further comprises at least one tab with a hole in said tab wherein said tab extends perpendicularly away from said edge of said second raised lip over and parallel to said first hole of said base member.

9. The system of claim 8 further comprising a holding device mounted to said base member wherein said holding device comprises a latch for securing items placed within said holding device.

10. The system of claim 9 wherein said holding device has a semi-circular shape so that hoses may be placed within said holding device wherein said latch may be closed so that said holding device and said latch may function to secure said hoses.

11. The system of claim 2 wherein said contact point of said elongated member of said fastening mechanism comprises a magnet positioned within said contact point that functions to provide additional force to said apparatus secured to said opening.

12. The system of claim 2 further comprising a lifting lug mounted to said base member.

13. The system of claim 2 further comprising a second fastening mechanism.

14. The system of claim 13 wherein said second fastening mechanism is mounted to said second raised lip.

15. The system of claim 1 wherein said one end of said elongated member that acts as a contact point is smaller than said end of the said elongated member that acts as an activation point.

16. A safety flange for securing an air circulating device to an enclosure opening comprising:
   a base with a plurality of bolt holes spaced apart from one another;
   a first raised lip protruding perpendicularly away from said base;
   a fastening mechanism secured to said base wherein said fastening mechanism comprises:
      an elongated member with two ends wherein one end of said elongated member acts as an activation point and the other end of said elongated member is a contact point that comes into contact with said air circulating device to be secured to said opening;
      at least two connection tabs mounted to said base and protruding perpendicularly out from said base;
      a tension member located between said two connection tabs; and
      a securing mechanism that secures said tension member and said elongated member to each other and to said connection tabs;
   a second raised lip wherein said second raised lip protrudes perpendicularly away from said base; and
   a holding device mounted to said base wherein said holding device comprises a latch for holding items placed within said holding device wherein said holding device has a semi-circular shape so that hoses may be placed within said holding device wherein said latch may be closed so that said holding device and said latch may function to secure said hoses.

17. The system of claim 16 wherein said safety flange is comprised of one or more of:
   steel;
   chrome;
   aluminum;
   Iron;

cooper;
lead;
cobalt;
nickel;
titanium fiberglass;
rubber;
clay;
plastic; and
polyvinyl chloride.

18. A method of securing a ventilation device to an enclosure opening, said method comprising:
  providing a system for securing an apparatus to an opening comprising:
    a circular base member having a first diameter with a first hole located in said circular base member wherein said first hole has a diameter smaller than said first diameter wherein said base member also includes a plurality of holes spaced apart from one another;
    at least one raised lip protruding perpendicularly away from said base member; and
    a fastening mechanism secured to said base member wherein said fastening mechanism comprises:
      an elongated member with two ends wherein one end of said elongated member acts as an activation point and the other end of said elongated member is a contact point that comes into contact with said ventilation device to be secured to said opening;
      at least two connection tabs mounted to said base member and protruding perpendicularly out from said base member;
      a tension member located between said two connection tabs; and
      a securing mechanism that secures said tension member and said elongated member to each other and to said connection tabs wherein said fastening mechanism is adjustable wherein said connection tabs comprise slots in said connection tabs whereby said securing mechanism may be positioned at different locations in said slots in said connection tabs;
  opening said enclosure;
  securing said provided system for securing an apparatus to an opening to said enclosure opening;
  depressing down upon said activation point to move said elongated member up;
  positioning said ventilation device within said first hole; and
  ceasing the depressing down upon said activation point so that said contact point will force down upon said ventilation device.

* * * * *